US011936933B1

(12) United States Patent
Sahni et al.

(10) Patent No.: US 11,936,933 B1
(45) Date of Patent: *Mar. 19, 2024

(54) BILL PAYMENTS FROM A VIDEO SCREEN

(71) Applicant: Wells Fargo Bank, N.A., San Francisco, CA (US)

(72) Inventors: Bipin M. Sahni, Pleasanton, CA (US); Balinder Mangat, Castro Valley, CA (US); David Hatch, Daly City, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,763

(22) Filed: Oct. 31, 2022

Related U.S. Application Data

(60) Continuation of application No. 16/928,784, filed on Jul. 14, 2020, now Pat. No. 11,490,144, which is a division of application No. 14/642,227, filed on Mar. 9, 2015, now Pat. No. 10,743,046.

(51) Int. Cl.
*H04N 21/2543* (2011.01)
*G06Q 30/04* (2012.01)
*G06Q 30/0601* (2023.01)
*H04N 21/478* (2011.01)

(52) U.S. Cl.
CPC ......... *H04N 21/2543* (2013.01); *G06Q 30/04* (2013.01); *G06Q 30/0643* (2013.01); *H04N 21/47805* (2013.01); *H04N 21/47815* (2013.01)

(58) Field of Classification Search
CPC ......... H04N 21/2543; H04N 21/47805; H04N 21/47815; G06Q 30/04; G06Q 30/0643
See application file for complete search history.

(56) References Cited

U.S. PATENT DOCUMENTS

| 7,720,768 B1 | 5/2010 | Risan |
| 8,165,956 B2 | 4/2012 | Kitchen et al. |
| 8,176,521 B2 | 5/2012 | Ellis et al. |
| 8,190,524 B2 | 5/2012 | Egendorf |

(Continued)

FOREIGN PATENT DOCUMENTS

| CN | 202210323 | 5/2012 |
| WO | WO-2011/034355 | 3/2011 |

OTHER PUBLICATIONS

Schmerken, Citigroup strives for secure multi-device access, Wall Street & Technology, Dec. 14, 2000, 2 pages.

*Primary Examiner* — Mulugeta Mengesha
(74) *Attorney, Agent, or Firm* — Foley & Lardner LLP

(57) ABSTRACT

A broadcast headend includes an upstream network circuit, an upstream signal processing circuit, and a content processing circuit. The upstream network circuit is configured to communicate with a financial institution computing system over an internet network. The upstream signal processing circuit is configured to broadcast a video content signal over a broadcast medium to a downstream device. The content processing circuit is configured to receive a content stream including a unique property code associated with a vendor; while the video content signal is being broadcast, parse the unique property code associated with the vendor from the content stream; and send a bill pay request to the financial institution computing system to effect a payment to the vendor.

20 Claims, 8 Drawing Sheets

(56) References Cited

U.S. PATENT DOCUMENTS

| | | | |
|---|---|---|---|
| 8,725,570 | B2 | 5/2014 | Doughty et al. |
| 2001/0053223 | A1* | 12/2001 | Ishibashi ............... H04L 9/3273 |
| | | | 380/231 |
| 2001/0056401 | A1 | 12/2001 | Tompkins |
| 2002/0059402 | A1 | 5/2002 | Belanger |
| 2003/0229590 | A1 | 12/2003 | Byrne et al. |
| 2004/0019900 | A1 | 1/2004 | Knightbridge et al. |
| 2005/0216401 | A1 | 9/2005 | Rines |
| 2006/0062426 | A1 | 3/2006 | Levy et al. |
| 2008/0235101 | A1 | 9/2008 | Piepenbrink et al. |
| 2009/0327111 | A1* | 12/2009 | Bulawa .............. H04N 7/17318 |
| | | | 705/40 |
| 2010/0049654 | A1 | 2/2010 | Pilo |
| 2010/0251304 | A1 | 9/2010 | Donoghue et al. |
| 2012/0078781 | A1* | 3/2012 | Ross ................... G06Q 20/102 |
| | | | 705/40 |
| 2012/0222055 | A1 | 8/2012 | Schaefer et al. |
| 2012/0254002 | A1 | 10/2012 | Kundagrami et al. |
| 2013/0166452 | A1* | 6/2013 | Song ................ H04N 21/47815 |
| | | | 705/44 |
| 2013/0188095 | A1 | 7/2013 | Hartson et al. |
| 2013/0325567 | A1* | 12/2013 | Bradley ................ G06Q 30/02 |
| | | | 705/14.1 |
| 2014/0129448 | A1 | 5/2014 | Aiglstorfer |
| 2014/0297381 | A1 | 10/2014 | Park |
| 2014/0359644 | A1* | 12/2014 | Kumar ............. H04N 21/23418 |
| | | | 725/60 |
| 2015/0039497 | A1 | 2/2015 | Weiss |
| 2015/0074711 | A1 | 3/2015 | Spitz et al. |
| 2016/0205439 | A1 | 7/2016 | Bonovich et al. |

* cited by examiner

BILL PAYMENTS FROM A VIDEO SCREEN

CROSS-REFERENCE TO RELATED PATENT APPLICATIONS

This application is continuation of U.S. patent application Ser. No. 16/928,784, filed on Jul. 14, 2020, which is a divisional of U.S. patent application Ser. No. 14/642,227, filed on Mar. 9, 2015, each of which is hereby incorporated by reference in its entirety and for all purposes.

FIELD

The present disclosure generally relates to online payment systems using video content displaying devices.

BACKGROUND

Massive quantities of video content are readily available from many providers. Often included in the video content are incidences of real-world products and services, which can take the form of product placements in a television show, or advertisements during a commercial break. Usually, however, video content can only be passively consumed by a viewer. If a product or service of interest is presented to a viewer, that viewer usually has to resort to some other device or medium to obtain it.

SUMMARY

One embodiment relates to a bill pay request generating device. The device comprises a downstream network logic configured to access and exchange data over a network. The device further comprises a downstream signal processing logic configured to receive a video content stream. The device comprises a data processing logic. The data processing logic is configured to cause a display to present video content based on the video content stream. The data processing logic is further configured to overlay a bill pay user interface on top of the video content, wherein the bill pay user interface corresponds to a vendor associated with the video content. The data processing logic is configured to send a bill pay request through the downstream network logic to effect a payment to the vendor.

Another embodiment relates to a computer-implemented method. The method comprises maintaining, by an account processing logic, a database that includes account information for at least one customer of a financial institution. The method further comprises maintaining, by a bill pay processing logic, a bill pay database that includes at least one registered biller. The method comprises providing, by a financial institution computing system, a bill pay feature by which a customer can cause a payment to be issued to a registered biller. The method further comprises receiving, by a financial institution network logic, a bill pay request to a vendor corresponding to a segment of financial institution computing system broadcast video content. The method comprises completing, by a bill pay processing logic, a bill pay request by causing funds from the customer's account to be sent to the vendor.

An additional embodiment relates to a non-transitory computer readable media having computer-executable instructions embodied therein that, when executed by a data processing logic of a bill pay request generating device, causes the bill pay request generating device to perform operations to issue bill pay requests over a network. The operations comprise cause a display to present video content based on a content stream. The operations further comprise overlay a bill pay user interface on top of a segment of the video content, wherein the bill pay user interface corresponds to a vendor associated with the segment of the video content. The operations comprise send a bill pay request over a network through a downstream network logic to effect a payment to the vendor.

Yet another embodiment relates to a broadcast headend. The headend comprises an upstream network logic configured to access and exchange data over a network. The headend further comprises an upstream signal processing logic configured to broadcast a video content signal. The headend comprises a content processing logic. The content processing logic is configured to receive a content stream including at least one property code associated with a segment of video content. The content processing logic is further configured to receive a bill pay request to a vendor corresponding to the at least one property code. The content processing logic is configured to send the bill pay request to a financial institution computing system to effect a payment to the vendor.

These and other features, together with the organization and manner of operation thereof, will become apparent from the following detailed description when taken in conjunction with the accompanying drawings.

DETAILED DESCRIPTION

Referring to the figures generally, systems and methods for generating bill pay requests using internet-enabled video displaying devices (or screens) are described. A system for integrating software applications into the video content displayed on an internet-enabled video screen allows its users to request transactions related to products and services presented in the video content. For example, after a user turns on an internet-enabled video screen, causing it to connect to the internet and display video content, a commercial advertisement appears. At some point during the commercial advertisement, a software application causes a graphical user interface to appear on the video screen, prompting the user to interact with it. The user interface relates to the subject matter of the commercial advertisement, such as a reminder to pay a bill for the advertised service, or an invitation to purchase an advertised product. The user may then, for example, use the interface to generate a bill pay request corresponding to the product or service presented in the advertisement.

Figure 1:
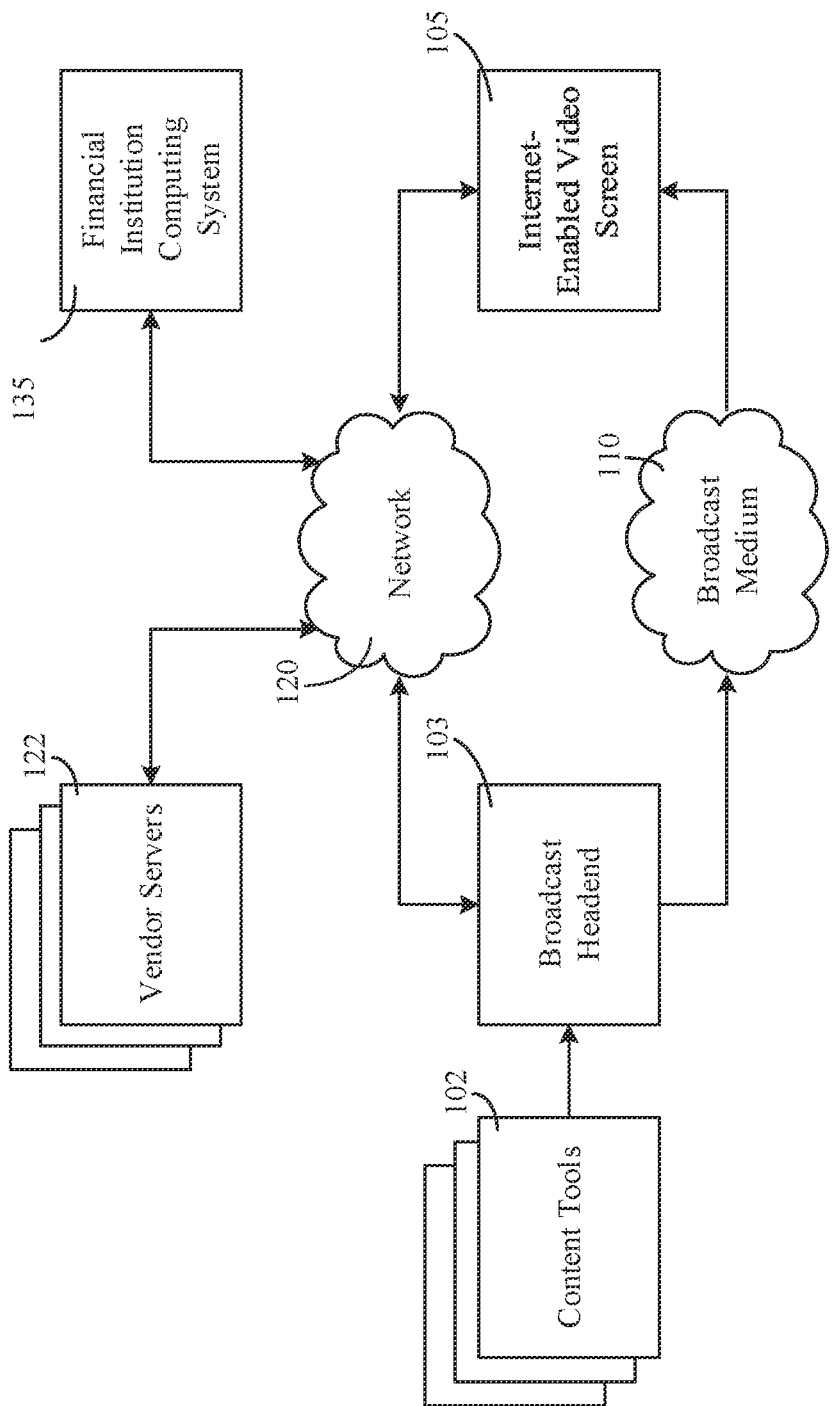
FIG. 1 is a schematic diagram of a computer-implemented bill pay request generating system using an internet-enabled, video displaying device according to an example embodiment.

Referring to FIG. 1, a schematic diagram of a computer-implemented bill pay request generating system 100 is shown according to an example embodiment. System 100 provides a bill pay request generating system via a source of video content (e.g., content tools 102), a broadcast headend 103, an internet-enabled video screen 105, vendor servers 122, and a financial institution computing system 135. Users of system 100 include individuals consuming video content. Internet-enabled video screens 105 are video displaying devices that are capable of accessing data networks. Internet-enabled video screens 105 may include home theater displays with integrated or external computing systems that are configured to connect to a network. Such home theater displays can include, by way of example, LCD, plasma, or LED televisions, or projectors and projection screens. In some of these arrangements, the internet-enabled video screen 105 is a video screen communicatively engaged to an external set top box (e.g., a cable box, a Roku™, an Apple TV™, a Chromecast™, or the like). In other arrangements, internet-enabled video screens 105 may be a part of a dedicated personal computing system, such as a monitor for a personal computer or a laptop. In yet other arrangements, internet-enabled video screens 105 include mobile devices such as smartphones, PDAs, and tablets.

Content tools 102 are sources of video content that may include broadcast cable or satellite video programming, internet-based videos, internet-based streaming video feeds, and the like. Broadcasting is the transmission of audio and/or video content from at least one source to at least one device capable of presenting the audio and/or video content to an individual. In various arrangements, broadcasting can occur over a variety of mediums, including radio waves, satellite transmissions, data cables, wireless networks (e.g., 3G or 4G cellular networks or wireless internet networks), among others. As such, broadcasting can cause a segment of audio/visual content to be received and presented by a single device, or several million (or more) devices. Video content from content tools 102 can be processed at a broadcast headend 103, which can broadcast video content to an internet-enabled video screen 105.

Vendor servers 122 are remote computing systems that are associated with various vendors such as merchants (e.g., retail shops, online stores, and the like) and service providers (e.g., utility providers, cleaning services, delivery services, loan services, financial institutions, and the like) with databases of information that include customer information, outstanding debts, bills, and/or invoices, and payment histories. Vendor servers 122 are also capable of exchanging data over a network (e.g., network 120). In some arrangements, vendor servers 122 further include software applications that can be downloaded by users' internet-enabled video screens to perform operations associated with the user interface 132, which is discussed in more detail below.

Financial institution computing system 135 is a remote, computer-enabled transaction processing system at a financial institution (e.g., banks, credit unions, etc.). Financial institution computing system 135 provides a bill pay feature, maintains databases of its customers' information—including personal information, account information, and customers' respective registered billers—and can access information stored at the vendor servers 122.

In one embodiment, a registered biller is a collection of information relating to a vendor or provider of goods and/or services, sufficient for a payment to that vendor or provider to be made. In some arrangements, registered billers are stored in profiles of information in a database. The bill pay feature is a service where a customer of a financial institution can select from pre-configured registered billers and/or can configure vendors' payment information (e.g., names, remittance addresses, account numbers, and the like) as registered billers at the financial institution computing system. After a vendor is configured as a registered biller for a customer, the financial institution computing system issues payments (e.g., via paper or electronic checks) to satisfy debts, bills, and invoices with the vendor with funds from the customer's account at the financial institution. This can be accomplished, for example, where a customer transmits a bill pay request to the financial institution computing system, which can be an authorized request to pay an identified registered biller a specified sum of funds from a customer's financial account.

The financial institution computing system 135 can provide the bill pay feature to customers via a website or a software application that can be downloaded and installed on a customer's mobile device or other personal computing system. For example, the website or the application can be configured such that, upon providing a username and a personal identification number or password, a link to a "Bill Pay" function can be presented to the customer. The customer can then interact with the "Bill Pay" link to cause the website or application to present a combination of instructions, menus, and interactive fields to allow the customer to set up new registered billers (e.g., by entering a vendor's name, remittance address, phone number, and the like into a new registered biller profile) or to generate a bill pay request. The bill pay requests created using system 100 are ultimately performed by the bill pay feature.

The various components of system 100 are configured to communicate with each other via a network 120 and/or a broadcast medium 110, as shown. The network 120 may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 120 includes the internet. The broadcast medium 110 includes both wired (e.g., fiber-optic or coaxial cables) and wireless mediums (e.g., radio frequencies) for signal transmission. In some arrangements, the broadcast medium 110 includes the internet as well.

In operation, the computer-implemented bill pay request preparation system 100 associates the content displayed on a user's internet-enabled video screen 105 with the user's registered billers at the user's financial institution, and can therefore provide users with a way to pay outstanding or upcoming bills or purchase products and/or services relevant to the video content appearing on the user's internet-enabled video screen. The internet-enabled video screen 105 also provides an interface for the user to create new registered billers and/or authorize the financial institution computing system 135 to prepare and issue payments to registered billers (e.g., via a bill pay request). The relationships between these various aspects of system 100 are described in further detail below.

Figure 2:
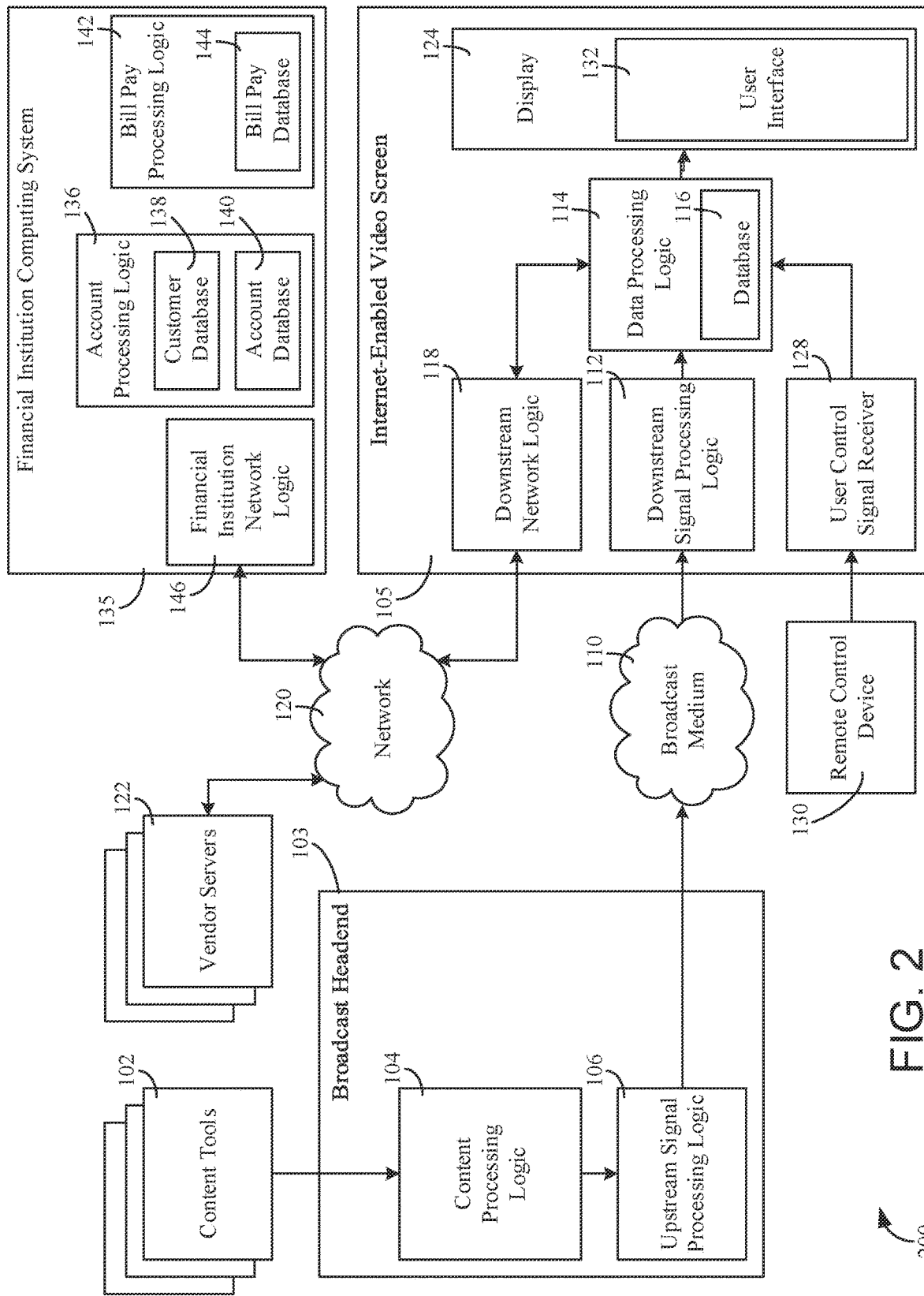
FIG. 2 is a schematic diagram of an example embodiment of a computer-implemented bill pay request generating system.

Referring now to FIG. 2, a schematic diagram of a computer-implemented bill pay request generating system is shown according to an example embodiment 200. Content tools 102 are video content servers that provide video content and property codes associated with products and/or services shown within segments of video content to a broadcast headend 103. Property codes are unique codes or tags that identify the merchants or service providers associated with a given segment of video content. For example, the content tools 102 can sequentially feed video content data, including the audio and video data, for one television show, one commercial for service A, one commercial for product B, and one commercial for service C, to the broadcast headend 103. Also included in the video content data for commercials for A, B, and C are three unique property codes that specifically identify service A, product B, and service C respectively. As such, the property codes provided by the content tools 102 make it possible for downstream devices receiving the video content data to specifically identify content relating to service A, product B, or service C when they are being displayed.

The broadcast headend 103 is a facility that includes hardware and software systems configured to receive, process, and distribute the video content data from the content tools 102. In example embodiment 200, the broadcast headend 103 includes a content processing logic 104, and an upstream signal processing logic 106. In some arrangements, the broadcast headend 103 includes satellite dishes, antennas, and/or other wireless hardware systems configured to receive video content data from the content tools 102. In other arrangements, the broadcast headend 103 includes fiber optic cables, coaxial cables, or other wired hardware systems configured to receive video content data from the content tools 102. The content processing logic 104 is configured to work with the broadcast headend's 103 hardware systems to receive video content data, and route the data to the upstream signal processing logic 106.

The upstream signal processing logic 106 receives the video content data from the content processing logic 104. The signal processing logic 106 then converts the video content data into content streams that will ultimately be recognized and displayed by a user's internet-enabled video screen 105. For example, for internet-enabled video screens 105 using traditional analog cable, the signal processing logic 106 can convert the video content data into separate audio and video streams. On the other hand, for internet-enabled video screens 105 using digital cable, the signal processing logic 106 can convert the video content data into a digital cable stream. The upstream signal processing logic 106 also includes the property codes in one of the streams resulting from video content data received from the content tools 102. In some arrangements, the upstream signal processing logic 106 converts the content stream into channel-specific signals by modulating content streams onto specific frequencies (for example, for analog cable programming) or specific frequencies and amplitudes (for example, for digital cable programming). The signal processing logic 106 then broadcasts the video signals over the broadcast medium 110.

A plurality of vendor servers 122 are configured to access the network 120. The vendor servers 122 are configured to receive requests for information relating to upcoming or outstanding bills or invoices over the network 120, and are further configured to transmit the requested information over the network 120. In some arrangements, the vendor servers 122 are configured to transmit software applications to an internet-enabled video screen 105 over the network 120.

The financial institution computing system 135 is a computer system (e.g., one or more servers each with one or more processing circuits), including a processor and memory. The processor may be implemented as application specific integrated circuits (ASICs), one or more field programmable gate arrays (FPGAs), a group of processing components, or other suitable electronic processing components. The memory may be one or more devices (e.g., RAM, ROM, flash memory, hard disk storage, etc.) for storing data and/or computer code for completing and/or facilitating the various processes described herein. The memory may be or include non-transient volatile memory, non-volatile memory, non-transitory computer storage media. The memory may include data base components, object code components, script components, or any other type of information structure for supporting the various activities and information structures described herein. The memory may be communicably connected to the processor and include computer code or instructions for executing one or more processes described herein. The financial institution computing system 135 also includes an account processing logic 136, a bill pay processing logic 142, and a financial institution network logic 146, which performs the functions described below as a result of the processor and memory.

The financial institution network logic 146 is configured to allow the financial institution computing system 135 to exchange information over the network 120. The account processing logic 136 can be configured to manage financial accounts associated with a financial institution's customers, including recording account balance and transaction histories, processing deposits and debits, preparing and transmitting payments to third parties, and exchanging customer information via financial institution network logic 146. In some embodiments, the account processing logic 136 can use information in a bill pay database (e.g., bill pay database 144, as discussed below) to perform a payment from a customer account to a registered biller. In one such embodiment, the account processing logic 136 is configured to receive and fulfill bill pay requests sent by a user through an internet-enabled video screen 105. As such, the flow of funds into and out of customer accounts may be processed by the account processing logic 136 of the financial institution computing system 135.

The account processing logic 136 can be configured to manage and exchange information with a customer database 138 and an account database 140. The customer database 138 is a digital storage medium (e.g., on board or connected flash or disc-based memory storage, access to a networked cloud storage medium, or the like) containing information relating to each of the customers of the financial institution, including information required to complete the bill pay process (e.g., customer names, addresses, and the like). The account database 140 is also a digital storage medium, but includes information relating to financial accounts associated with each of the customers in the customer database 138, including account numbers, balance information, transaction histories, credit card accounts, and the like.

The bill pay processing logic 142 is configured to generate and store registered billers associated with a financial institution's customers. The bill pay processing logic 142 can transmit and receive information relating to customers' registered billers via the financial institution network logic 146, store new or updated registered biller information in a bill pay database 144, and interface with the account processing logic 136. In some embodiments, customer requests to create new registered billers are received and processed by the bill pay processing logic 142 via the financial institution network logic 146, and then stored in the bill pay database 144. The bill pay database 144 is a digital storage medium (e.g., on board or connected flash or disc-based memory storage, access to a networked cloud storage medium, or the like) containing information relating to the registered billers associated with each of the customers in the customer database 138. The information in the bill pay database 144 includes, for example, vendor names and remittance addresses, customer account numbers with the vendors, property codes associated with each vendor, and the like.

In some arrangements, the financial institution computing system 135 transmits information from the bill pay database 144 (e.g., information sufficient to identify each biller, such as biller names) to an internet-enabled video screen 105 associated with a customer in the customer database 138 over the network 120, where it can be stored in a local database (e.g., database 116). In other arrangements, the financial institution computing system 135 transmits information relating to individual registered billers for specific customers over the network 120 on an as-needed basis. The bill pay processing logic 142 can receive new or updated information through the financial institution network logic 146 and store the information in the bill pay database 144 accordingly. The bill pay processing logic 142 can also cause information stored in the bill pay database 144 to be sent over the network 120 via the financial institution network logic 146. Further, in one embodiment, the bill pay processing logic 142 is configured to receive and fulfill a bill pay request sent by a customer through an internet-enabled video screen 105.

In operation, a customer bill pay request can be received at a financial institution computing system 135 via financial institution network logic 146. In some embodiments, the bill pay request is then routed to the account processing logic 136. In one such embodiment, the bill pay request already includes information relating to the customer's registered biller, and the account processing logic 136 can prepare and transmit a payment (e.g., via electronic or paper check) to the registered biller from the customer's account. In another such embodiment, the bill pay request only identifies the customer's registered biller, in which case the account processing logic 136 can request and receive information regarding the registered biller from the bill pay database 144 via the bill pay processing logic 142. In other embodiments, the bill pay request is routed to the bill pay processing logic 142 (i.e., instead of account processing logic 136), which accesses the customer's payment and account information from the customer database 138 and the account database 140 via the account processing logic 136, and fulfills the customer's bill pay request.

The internet-enabled video screen 105 is a device configured to receive and process video content signals, access data networks, and allow users to consume video content. The internet-enabled video screen 105 includes a downstream signal processing logic 112, a data processing logic 114, a downstream network logic 118, a display 124, and a user control signal receiver 128. In some arrangements, all of the components of the internet-enabled video screen 105 are integrated into a single unit or housing (e.g., a "smart" television, a laptop, a tablet, or the like). In other arrangements, an external set top box comprising the downstream signal processing logic 112, data processing logic 114, and the downstream network logic 118 is communicatively engaged to the display 124. The composition of the set top box can vary, such that some set top boxes include some but not all of the components of the internet-enabled video screen 105 besides the display 124 (e.g., set top box A may include all of the components except for the display 124; set top box B may only include the data processing logic 114 and the downstream network logic 118, but the rest of the components are included with the display 124; and so on). The set top box can be engaged to the display 124 by a data transfer cable, including HDMI cables, USB cables, Ethernet cables, and the like.

The downstream network logic 118 is configured to allow the internet-enabled video screen 105 to exchange information over a network 120. The downstream signal processing logic 112 receives the video signals from the broadcast medium 110 and converts the signals into content streams. In some arrangements, the downstream signal processing logic 112 demodulates the video signals to channel-specific content streams. The downstream signal processing logic 112 directs the content streams to the data processing logic 114.

The data processing logic 114 is a component of the computer-implemented, internet-enabled video screen 105 that allows the internet-enabled video screen 105 to process broadcasted video data and present video content to a user, and processes incoming and outgoing data to and from the internet-enabled video screen 105. The data processing logic 114 interfaces with the downstream signal processing logic 112, the downstream network logic 118, the display 124, and the user control signal receiver 128. The data processing logic 114 also includes a database 116, which is a data storage medium. The database 116 can, for example, take the form of on board or connected flash or disc-based memory storage, or in some arrangements, access to a networked cloud storage medium. The database 116 is configured to store user information (e.g., name, address, and payment information) and software applications and related data (e.g., video content players such as Netflix™, Hulu™, YouTube™, or ESPN™ and the like, and/or bill pay request generating software applications, and/or data such as property code databases for merchants and service providers). The data processing logic 114 is configured to execute the software applications stored on the database 116 and also accesses, stores, and/or edits the information on the database 116. The data processing logic 114 can receive and store information from the downstream network logic 118 on the database 116, or cause information to be sent over the network 120 via the downstream network logic 118.

The data processing logic 114 is further configured to cause the display 124 to present audio and visual content and a user interface 132 to a user, and to receive user inputs through a user control signal receiver 128. A user interface 132 is a graphical user interface that presents possible actions that the user can take on the display 124. In some arrangements, the user can interact with the user interface via a remote control device 130, which is a device that allows users to send commands to the internet-enabled video screen 105. The remote control device 130 can take several forms, including a standard television remote control, or a mobile device (e.g., a smartphone) with a software application configured to communicate with the internet-enabled video screen 105. A user control signal receiver 128 is configured to receive signals from the remote control device 130, and send the signals to the data processing logic 114. In other arrangements, the user can interact with the user interface via controls on the internet-enabled video screen 105 itself. For example, a user can interact with the user interface 132 via buttons located on the frame of the internet-enabled video screen 105. Alternatively, if the internet-enabled video screen 105 includes a touchscreen (e.g., a tablet or smartphone), a user can interact with the user interface 132 via buttons that appear on the display 124.

The data processing logic 114 at the internet-enabled video screen 105 can be further configured to identify and parse out the property codes from the content stream received from the downstream signal processing logic 112. In some arrangements, the data processing logic 114 can compare the information from the bill pay database 144 stored on the database 116 with the parsed property codes to determine whether the content stream corresponds to any of the user's registered billers. In other arrangements, the data processing logic 114 can remotely access information in the bill pay database 144 over the network 120 through the downstream network logic 118 and compare property codes in the content stream with the user's registered billers in the bill pay database 144 for relevant vendors. The data processing logic 114 can therefore identify a customer's registered billers that are relevant to the incoming video content.

In one arrangement, the data processing logic 114 is configured to launch a software application on the internet-enabled video screen 105 that causes a user interface 132 to appear on the display 124 if a current segment of video content relates to one of the user's registered billers. The software application can be configured to access the bill pay processing logic 142 at the financial institution computing system 135, which can then determine whether the user has any upcoming or outstanding bills with the registered biller. Alternatively, the software application can be configured to directly access vendor servers 122 over the network 120 through the downstream network logic 118, and determine, for example, whether the user has any upcoming payments due, any overdue payments, or any outstanding invoices. The software application can also be configured to send requests, for example, for new purchases or subscriptions to the vendor servers 122. The software application is configured to present a graphical user interface 132 on the display 124 of the internet-enabled video screen 105, where the user can interact with the software application to prepare and transmit an authorized request to the financial institution computing system 135 to prepare and send a payment to a registered biller (e.g., a bill pay request).

In another arrangement, the data processing logic 114 can be configured to launch the software application on the internet-enabled video screen 105 even if the current segment of video content does not relate to one of the user's registered billers. In one such arrangement, after the data processing logic 114 parses out a property code from a given segment of video content and confirms that the property code does not correspond to any of a user's registered billers (e.g., after accessing a local database 116 or the bill pay database 144), the data processing logic 114 can launch the software application and present a graphical user interface 132 on the display 124, inviting the user to purchase a good or service by setting up a registered biller for the corresponding vendor. For example, an advertisement may invite a user to purchase a product for four monthly installments of $59.99. In some arrangements, the corresponding vendor's billing information can be pre-stored (e.g., at the vendor servers 122 or the bill pay database 144), and thus, the data processing logic 114 can compile all of the vendor's information needed to create a registered biller. Further, the internet-enabled video screen 105 may be registered with a financial institution and uniquely associated with the user. This can be accomplished by, for example, associating a unique code stored on the internet-enabled video screen 105 (e.g., a television serial number) with a customer of the financial institution at the financial institution computing system 135. Hence, the user would only have to authorize and confirm to purchase a product and/or create a new registered biller (e.g., by entering a PIN number and a confirmation). In these arrangements, the data processing logic 114 can also be configured to set up recurring payments to the resulting registered biller in the bill pay database 144 if the customer purchases a product or service which included an installment plan or ongoing payments.

In another arrangement where the data processing logic 114 parses a property code that does not correspond to any of a user's registered billers, the data processing logic 114 can also be configured to determine whether the user has previously issued payments to the corresponding vendor. In one such arrangement, the data processing logic 114 can send an inquiry to the account processing logic 136 over the network 120 that includes identifying user information and the property code or identifying information for the vendor corresponding to the property code. Upon receiving the inquiry, the account processing logic 136 can access information relating to the user from the customer database 138, and search the user's available accounts in the account database 140 (e.g., checking accounts, credit card accounts, and the like) for any transactions with the vendor corresponding to the property code. If the account processing logic 135 locates the vendor in the user's transaction history, the account processing logic 135 can notify the data processing logic 114 (e.g., over the network 120) that the user has previously transacted with the vendor. This can occur, for example, where the user has been paying for an ongoing service (e.g., cable) or an installment-based purchase (e.g., a purchase entailing 5 monthly payments of $50) with paper checks or a credit card. Upon receiving such a notification from the account processing logic 136, the data processing logic 114 can launch a software application that causes a user interface 132 to appear on the display 124, informing the user that previous transactions with the vendor corresponding to the video content have been made or are ongoing, and invite the user to create a registered biller for that vendor.

The software application can be provided to the internet-enabled video screen 105 by the vendor servers 122 or by the financial institution computing system 135 over the network 120. In some arrangements, the vendor servers 122 or the financial institution computing system 135 provides the software application after the data processing logic 114 identifies a registered biller and sends a request for the corresponding vendor's software application over the network 120. In other arrangements, at least one software application is pre-stored in the database 116 in the internet-enabled video screen 105, and the data processing logic 114 launches the application upon identifying a registered biller.

In one arrangement, the remote control device 130 allows a user to interact with the internet-enabled video screen 105. After the data processing logic 114 has loaded audio and visual content along with a software application's user interface 132 onto the display 124, a user can use the remote control device 130 to interact with the user interface 132 to authorize and cause bill pay requests to be issued from the financial institution computing system 135. The user interface 132 can present an on-board program configured to locally authorize (e.g., by requesting a password or PIN number) and send bill pay requests, or the user interface 132 can present the user with internet links to sites where bill pay requests can be generated (e.g., a financial institution's website). The user control signal receiver 128 detects the user's inputs into the remote control device 130 and routes the inputs to the data processing logic 114, which applies the user's inputs to the software application to authorize and create a bill pay request. The data processing logic 114 and the software application then sends the bill pay request to the downstream network logic 118, and through the network 120 to the financial institution computing system 135. The financial institution computing system 135 then executes the user's bill pay request.

Figure 3:
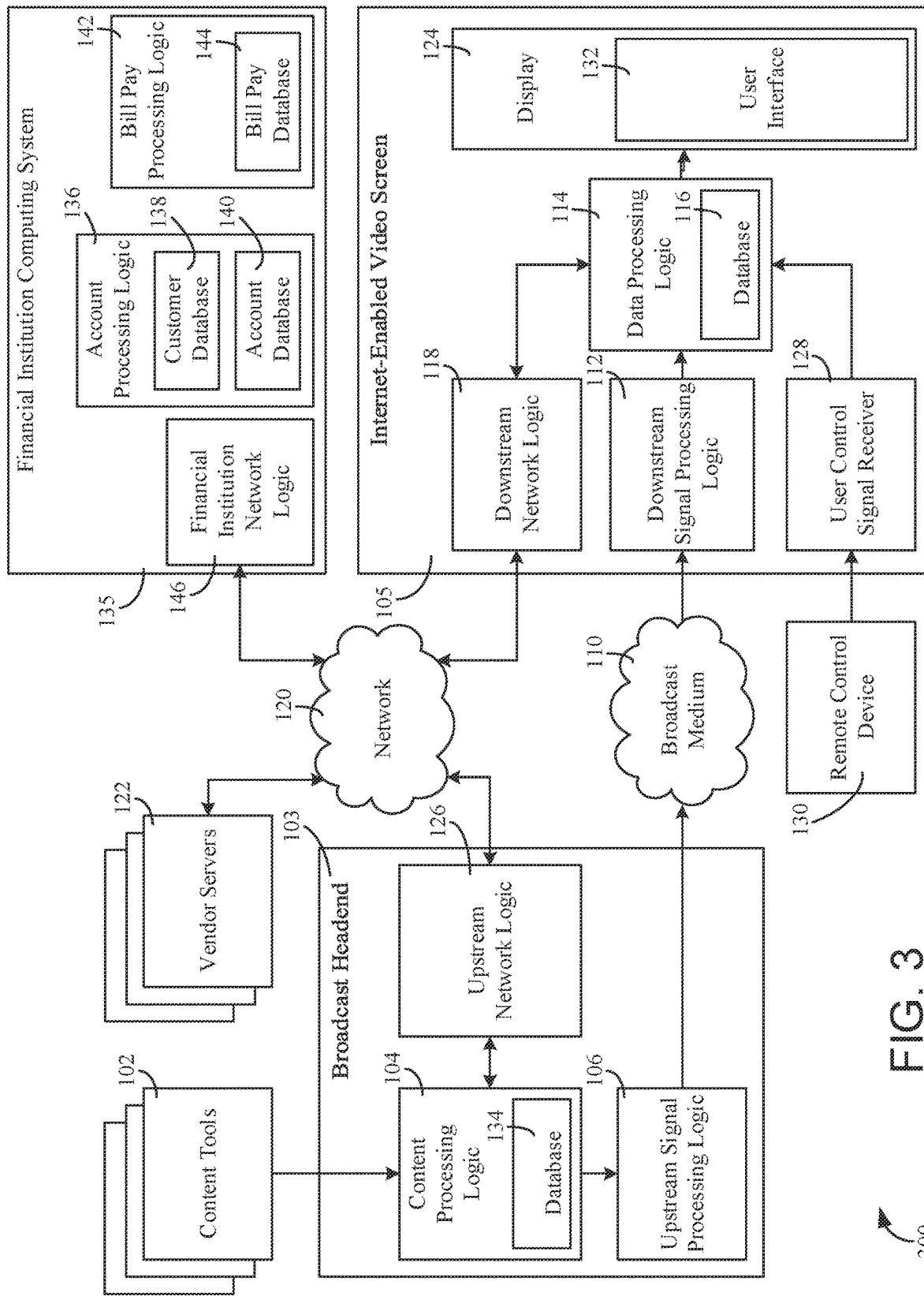
FIG. 3 is a schematic diagram of another example embodiment of a computer-implemented bill pay request generating system.

Referring now to FIG. 3, a schematic diagram of a computer-implemented bill pay request generating system is shown according to an alternative example embodiment 300. Example embodiment 300 includes all of the components and features of example embodiment 200, except the content processing logic 104 at the headend 103 further includes a database 134 and the broadcast headend 103 further includes an upstream network logic 126. Example embodiment 300 can still perform all of the functions described with respect to example embodiment 200 in FIG. 2 despite the addition of the upstream network logic 126 and the database 134, but the broadcast headend 103 can now exchange data and information over the network 120, as discussed below.

The upstream network logic 126 is configured to allow the broadcast headend 103 to exchange information over the network 120. The content processing logic 104 can receive and store information from the upstream network logic 126 on the database 134, or cause information to be sent over the network 120 via the upstream network logic 126.

The database 134 is a data storage medium at the broadcast headend 103. The database 134 can, for example, take the form of on board or connected flash or disc-based memory storage, or in some arrangements, access to a networked cloud storage medium. The database 134 is configured to store user information (e.g., name, address, and payment information). In some arrangements, the database 134 further includes software applications corresponding to a plurality of vendors (e.g., merchants and service providers). The database 134 can also be configured to store information relating to a plurality of vendors, including, for example, property code databases or information corresponding to information in the bill pay database 144 at a financial institution 135.

In one arrangement, the content processing logic 104 at the broadcast headend 103 is configured to parse out property codes from the video content data received from the content tools 102. In one such arrangement, the content processing logic 104 can compare the information from the bill pay database 144 and user information stored on the database 134 with property codes parsed from the video content data to determine whether any segments of the video content data corresponds to any of a user's registered billers. In doing so, the content processing logic 104 can remotely access information in the bill pay database 144 over the network 120 through the upstream network logic 126 and compare property codes parsed from the video content data with a user's registered billers in the bill pay database 144 to identify relevant vendors. The content processing logic 104 can therefore be configured to identify a user's registered billers associated with video content at the broadcast headend.

The content processing logic 104 can also be configured to parse property codes from the incoming video content data and transmit the property codes and a user's information from the database 134 through the network 120 (i.e., without identifying registered billers). In one such arrangement, the content processing logic 104 transmits property codes and a user's identification information to the financial institution computing system 135. The bill pay processing logic 142 at the financial institution computing system 135 can then compare the property codes with the user's registered billers in the bill pay database 144 to identify any matching vendors.

In one arrangement, after matching vendors are identified, the bill pay processing logic 142 can then access the vendor servers 122 over the network 120 to determine whether the user has any upcoming or outstanding bills, debts, or invoices with any of the relevant vendors. If the user has any upcoming or outstanding bills, debts, or invoices associated with at least one relevant vendor, the bill pay processing logic 142 can be configured to transmit information relating to the relevant vendor and the amount due to the data processing logic 114 at the internet-enabled video screen 105 over the network 120. In another arrangement, the bill pay processing logic 142 returns a list matching vendors to the content processing logic 104 at the broadcast headend 103, and the content processing logic 104 may then retrieve bill, debt, or invoice information from corresponding vendor servers 122 and transmit that information to the data processing logic 114 at the internet-enabled video screen 105.

The data processing logic 114 at the internet-enabled video screen 105 can parse out a property code from a content stream received from the downstream signal processing logic 112 and cause a user interface 132 to appear on the display. In some arrangements, the data processing logic 114 also receives debt, bill, and/or invoice information relating to the vendor corresponding to the property code from the financial institution computing system 135, the broadcast headend 103, or vendor servers 122 and includes the information in the user interface 132. In some arrangements, the software application underlying the user interface 132 is downloaded from the corresponding vendor servers 122, the broadcast headend 103, or the financial institution computing system 135 over the network 120 before being presented to the user. In other arrangements, the software application is pre-stored on the database 116 at the internet-enabled video screen 105.

The upstream signal processing logic 106 is configured to prepare and transmit video signals and property codes to an internet-enabled video screen 105 (as discussed above with respect to FIG. 2). In some arrangements, the content processing logic 104 parses the property codes in the video content data received from the content tools 102 leading to the identification of relevant vendors (as discussed above) in parallel with the video signal broadcast. As such, the identification of vendors that are registered billers and are associated with segments of video content can occur in parallel while video content streams are broadcasted to a user's internet-enabled video screen.

Figure 4A:
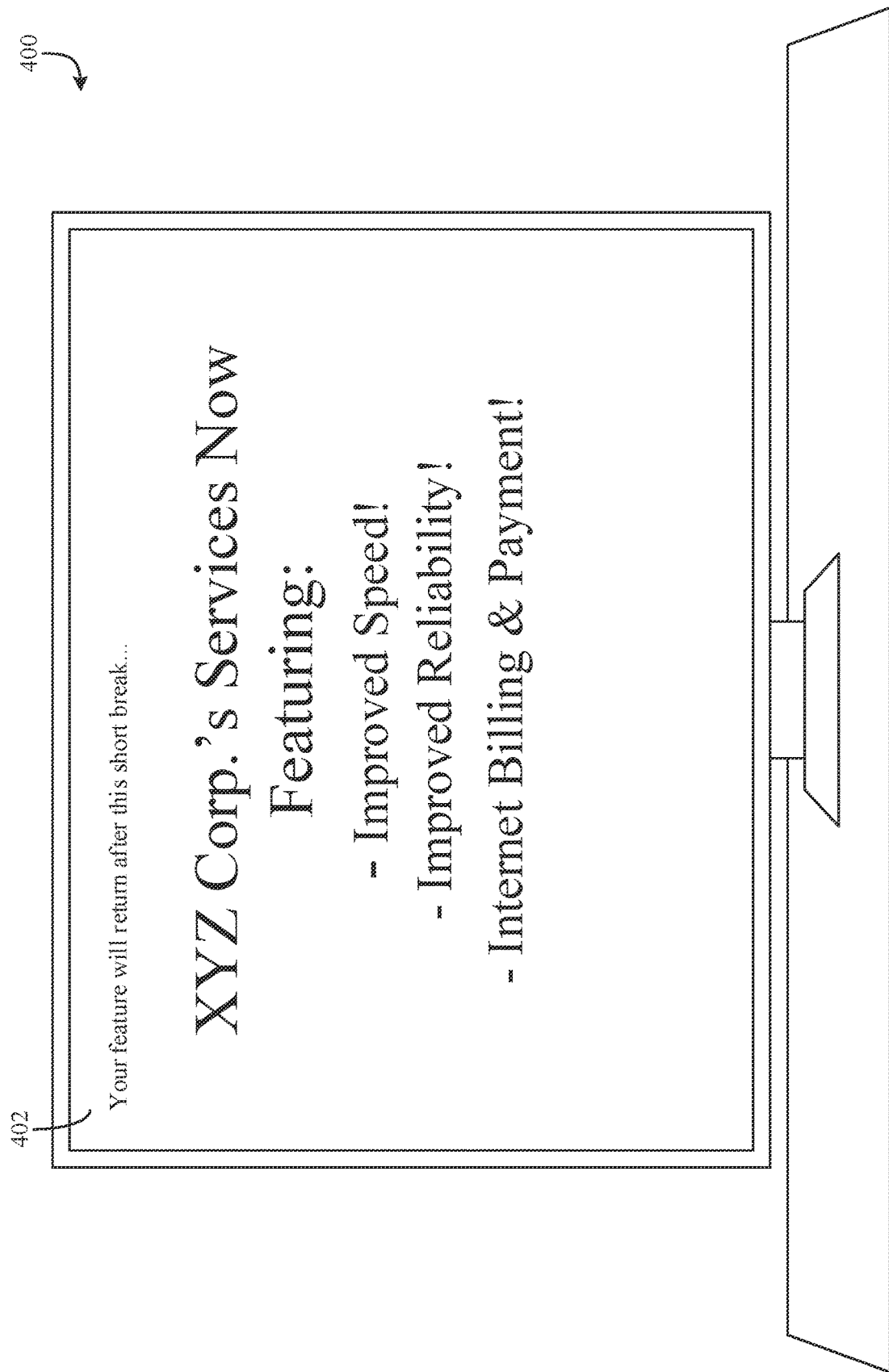
FIGS. 4A and 4B are illustrative diagrams of an internet-enabled, video displaying device showing a commercial advertisement according to an example embodiment.

Referring now to FIG. 4A, an example display 400 of the internet-enabled video screen 105 is shown according to an example embodiment. The display 400 in FIG. 4A initially presents a passive commercial video advertisement 402 for a service company called "XYZ Corp." The advertisement 402 can include audio, video, and textual content relating to the products and services offered by the company. The advertisement is also associated with a property code specific to XYZ Corp. While the passive commercial video advertisement 402 is presented on the display 400, a computer-implemented bill pay request generating system (e.g., system 200 or system 300, as discussed with respect to FIGS. 2 and 3, above) can determine whether the user viewing the display 400 has previously registered XYZ Corp. as a biller at the user's financial institution. The system can also determine whether the user has any upcoming or outstanding debts, bills, or invoices with XYZ Corp.

Figure 4B:
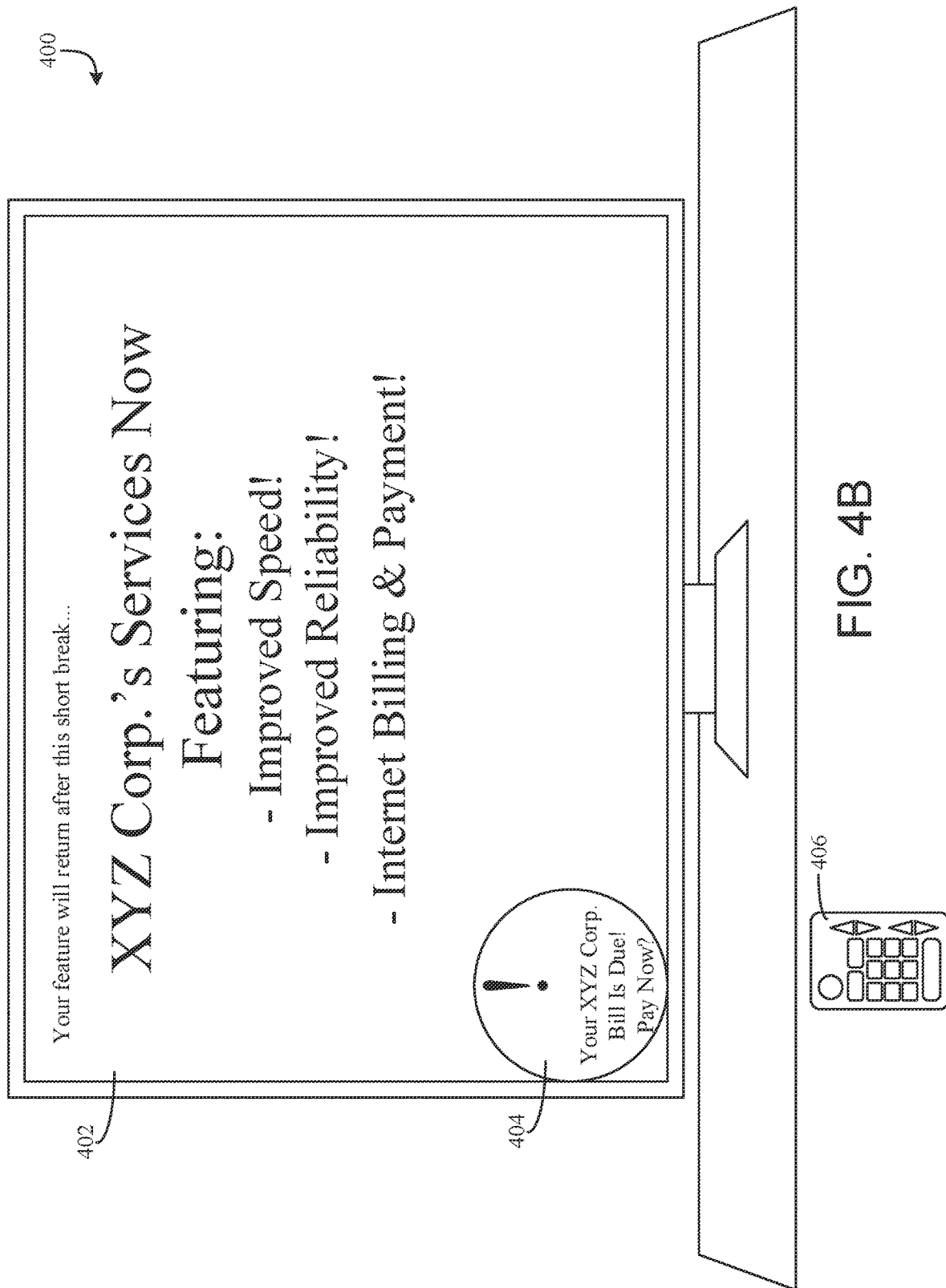

Referring now to FIG. 4B, the display 400 of FIG. 4A has been updated after the internet-enabled video screen executes a software application. Here, the computer-implemented bill pay request generating system has confirmed that the user has previously registered XYZ Corp. as a biller with the user's financial institution, and that the user has a XYZ Corp. bill coming due. The display continues to passively present the advertisement 402, but now overlays a graphical user interface 404 (e.g., a user interface 132 of FIG. 2) on top of the passive advertisement 402. The graphical user interface 404 relates to the user's bill coming due for XYZ Corp., the vendor associated with the underlying advertisement. The graphical user interface 404 prompts the user to interact with it by asking whether the user wants to pay the upcoming bill. The user can interact with the graphical user interface 404 via the user's remote control device 406 (i.e., the remote control device 130 of FIG. 2).

Figure 5:
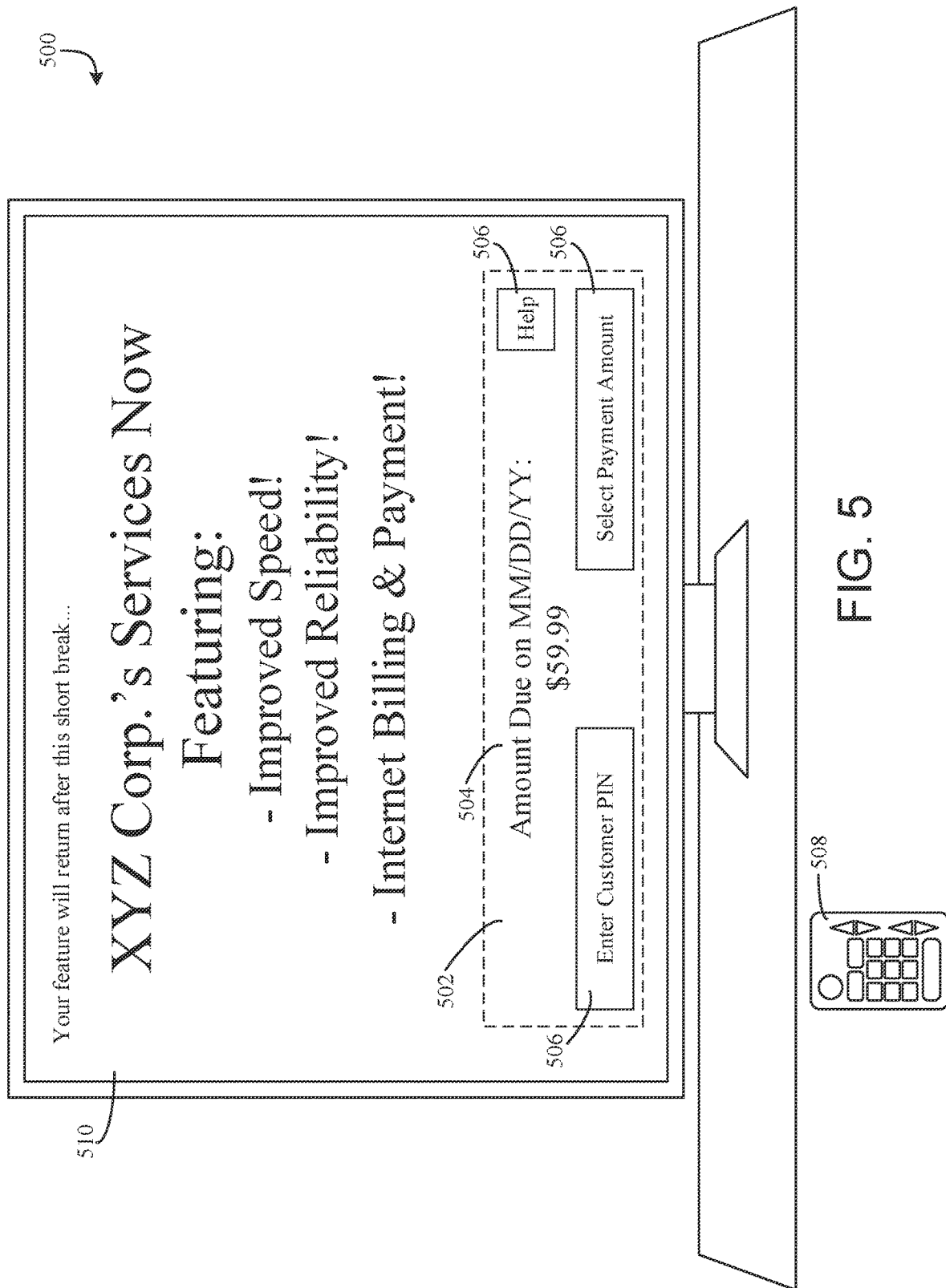
FIG. 5 is an illustrative diagram of an internet-enabled, video displaying device showing a commercial advertisement with a user interface overlay according to an example embodiment.

Referring now to FIG. 5, an expanded graphical user interface 502 is shown according to an example embodiment. Here, the display 500 has again been updated to an expanded graphical user interface 502 after the user has interacted with the previous graphical user interface (i.e., graphical user interface 404 of FIG. 4B) to begin preparing a bill pay request. The expanded graphical user interface 502 includes user-specific information 504 from the relevant vendor (e.g., the amount due to the relevant vendor and the due date) and interactive buttons 506 that the user can select using the remote control device 508. The functions underlying the interactive buttons 506 can include, for example, an authorization function where the user's identity can be verified (e.g., by entering a user-specific PIN number), a value setting function where the user can set the desired amount to be paid to the relevant vendor, and a help function configured to provide the user with assistance in using the expanded graphical user interface 502. In this embodiment, the passive commercial video advertisement 510 continues to play in the background while the expanded graphical user interface is presented on the display 500.

Figure 6:
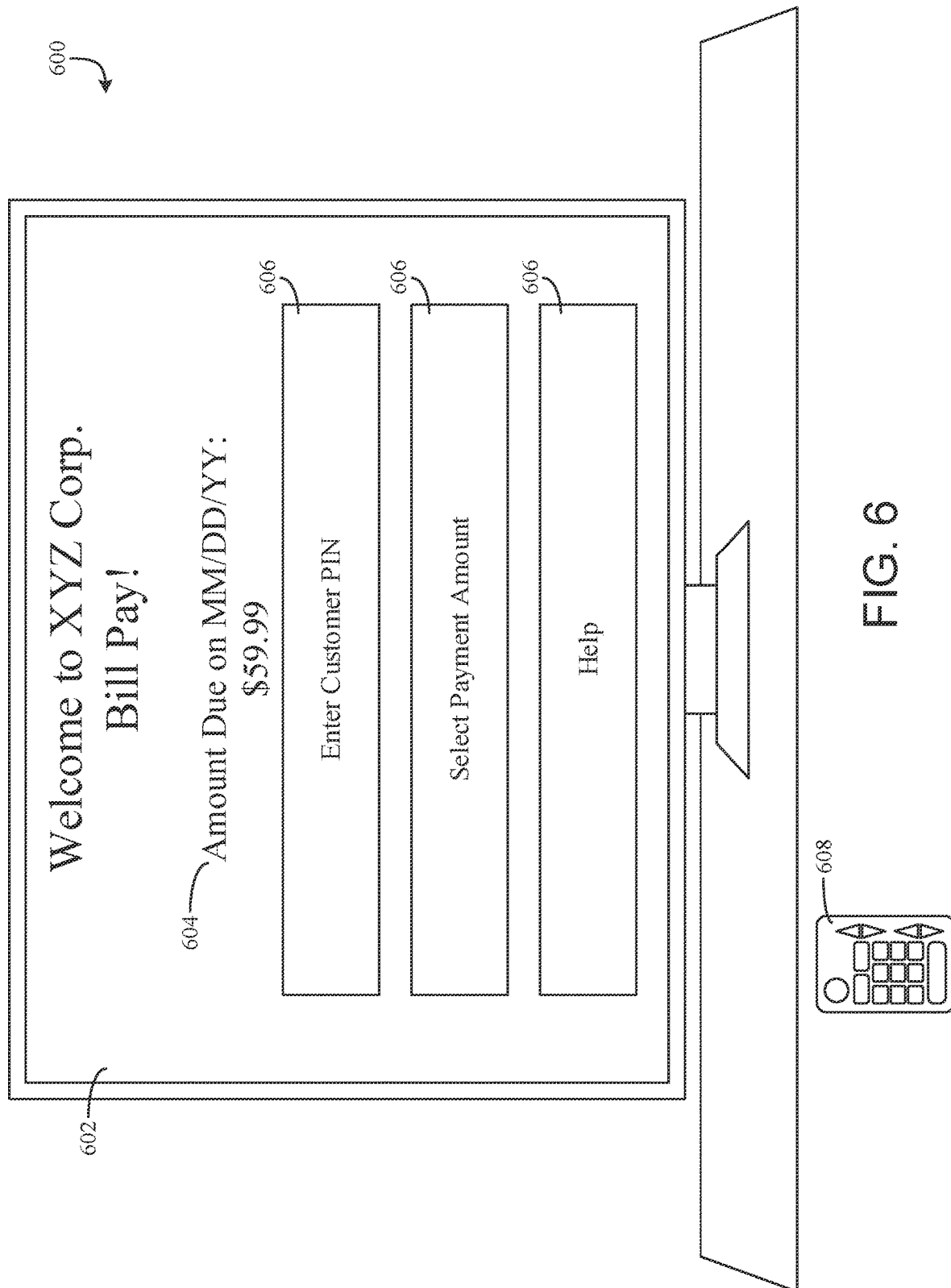
FIG. 6 is an illustrative diagram of an internet-enabled, video displaying device showing a full-screen user interface according to another example embodiment.

Referring now to FIG. 6, an alternative expanded graphical user interface 602 is shown according to an example embodiment. Here, instead of partially overlaying an expanded user interface over the passive content on the display (as discussed with respect to FIG. 5), the alternative expanded graphical user interface 602 is a full-screen user interface. The alternative expanded graphical user interface 602 is substantively similar to the expanded graphical user interface shown in FIG. 5, complete with user-specific information 604 and interactive buttons 606 that can be controlled with a remote control device 608.

Figure 7:
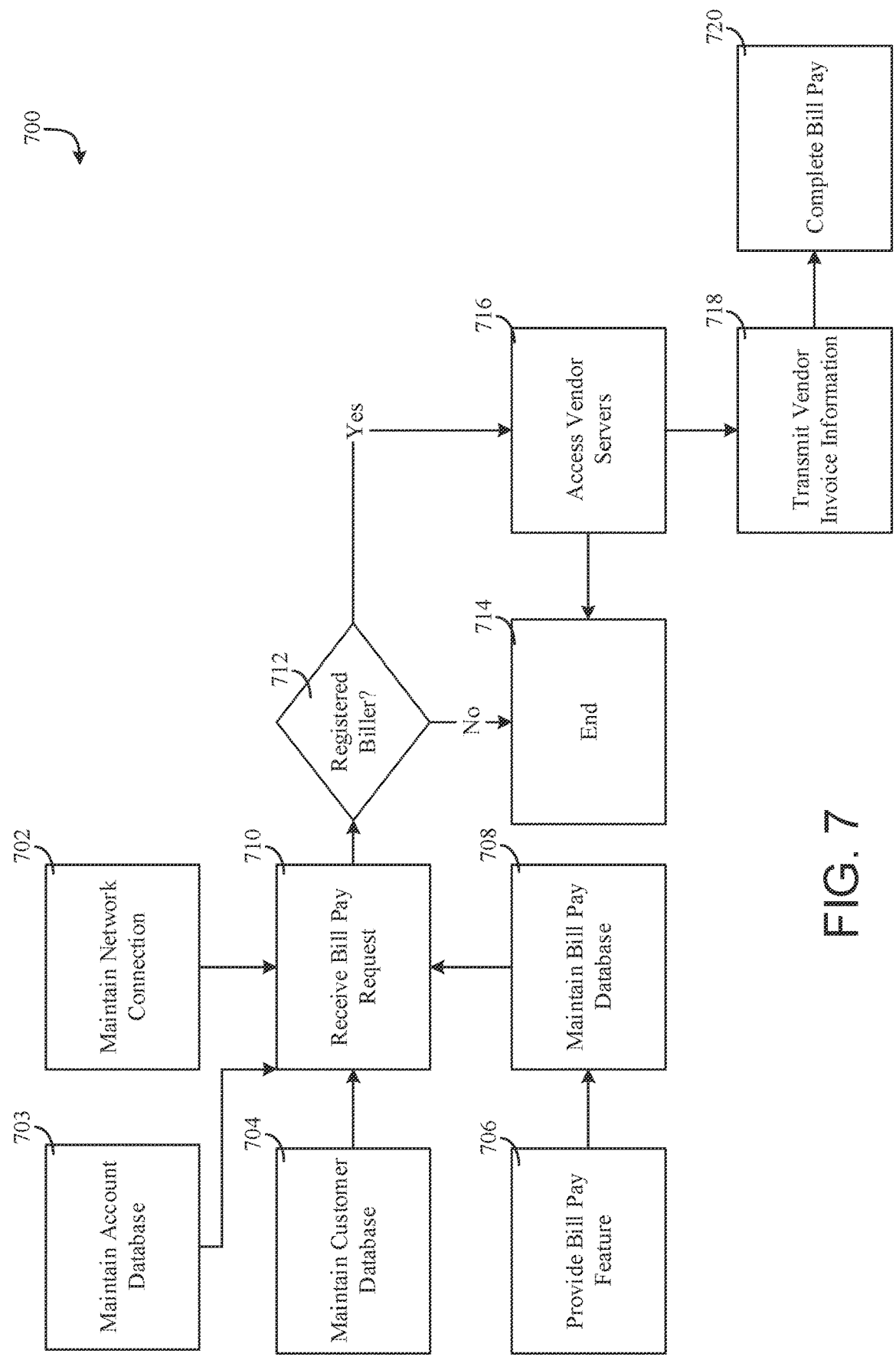
FIG. 7 is a flow diagram of a method of generating bill pay requests through an internet-enabled, video displaying device according to an example embodiment.

Referring now to FIG. 7, a flow diagram of a method 700 of processing bill pay requests is shown according to an example embodiment. The method 700 is performed by a financial institution computing system (e.g., financial institution computing system 135) within a computer-implemented bill pay request preparation system (e.g., system 100 and embodiments thereof). As discussed above with respect to system 100 and various embodiments of system 100, and in further detail below with respect to method 700, the financial institution computing system is configured to allow customers to efficiently generate payment requests while consuming audio and video content.

A network connection is maintained (702). The network connection is maintained by a network logic (e.g., financial institution network logic 146) at a financial institution computing system (e.g., financial institution computing system 135) and enables the financial institution computing system to send and receive data from other computing systems and servers over a data network (e.g., network 120). The data that is accessible over a maintained network includes, but is not limited to, information relating to the financial institution's customers (e.g., identification information, account number information, and the like), information relating to registered billers (e.g., biller names, remittance addresses, and the like), property codes associated with those billers, and customer bill pay requests.

An account database is maintained (703). The account database (e.g., account database 140) is maintained by an account processing logic (e.g., account processing logic 136) at the financial institution computing system. The account processing logic maintains the account database on a storage medium at the financial institution computing system (e.g., flash or disc-based digital storage, cloud-based storage, and the like) to contain information relating to financial accounts for each of the customers of the financial institution, including account numbers, account balances, transaction histories, number and types of financial accounts, and the like).

A customer database is maintained (704). The customer database (e.g., customer database 138) is maintained by an account processing logic (e.g., account processing logic 136) at the financial institution computing system. The account processing logic maintains the customer database on a storage medium at the financial institution computing system (e.g., flash or disc-based digital storage, cloud-based storage, and the like) to contain information relating to each of the customers of the financial institution, including information required to complete the bill pay process (e.g., customer names, addresses, and the like).

A bill pay feature is provided (706). The bill pay feature is a service where a customer of a financial institution can store vendors' payment information (e.g., names, remittance addresses, account numbers, and the like) as registered billers at the financial institution computing system, and cause the financial institution computing system to issue payments (e.g., via paper or electronic checks) to satisfy debts, bills, and invoices with those vendors with funds from the customer's account at the financial institution. The bill pay feature is provided by the financial institution computing system, which may transmit data to and from customers and their respective vendors over a network (e.g., over the network connection maintained at 702) in order to receive and complete customer bill pay requests.

A bill pay database is maintained (708). The bill pay database (e.g., bill pay database 144) is maintained by a bill pay processing logic (e.g., bill pay processing logic 142) at the financial institution computing system. The bill pay processing logic maintains the bill pay database on a storage medium at the financial institution computing system (e.g., flash or disc-based digital storage, cloud-based storage, and the like) to contain information relating to registered billers associated with each of the customers in the customer database maintained at 704. The information in the bill pay database includes, for example, biller names, remittance addresses, customer account numbers with the biller, property codes associated with each biller, and the like.

A bill pay request is received (710). The bill pay request is received from a network (e.g., network 120) by the bill pay processing logic at the financial institution computing system via a network logic (e.g., financial institution network logic 146). The bill pay request is an authorized request by the customer identified at 712 for the financial institution computing system to issue a payment to a registered biller identified at 712, using funds associated with an account at the financial institution that is associated with the identified customer. The bill pay request includes vendor information, customer information, and an amount of funds to be paid. The vendor information received is information sufficient to identify a particular vendor and can include, for example, property codes (as discussed with respect to FIGS. 1 through 3, above), vendor names, vendor remittance addresses, and/or other similar identifying information. The customer information received is information sufficient to identify a particular customer with the financial institution, and can include, for example, names, addresses, customer account numbers with the financial institution, and/or other similar identifying information.

Whether the vendor corresponding to the vendor information received is a registered biller is determined (712). A registered biller a collection of information relating to an individual or an entity that a customer (i.e., the customer corresponding to the customer information received) has registered for the bill pay service provided at 706. Upon receiving vendor and customer information, the bill pay processing logic at the financial institution computing system can first search the customer database (i.e., the customer database maintained at 704) for the customer information received to determine whether the information received corresponds to a customer of the financial institution. If the customer information received does not correspond to a customer of the financial institution, method 700 ends (714) and no further actions are taken. If, on the other hand, the bill pay processing logic locates a corresponding customer, the bill pay processing logic can search the bill pay database (i.e., the bill pay database maintained at 708) for any registered billers associated with that customer that match the vendor information received. In some arrangements, if no registered billers in the bill pay database matches the vendor information received, method 700 ends at 714. In other arrangements, if no matches are found in the bill pay database, a new registered biller corresponding to the vendor information received is added to the bill pay database.

Vendor servers are accessed (716). Vendor servers are remote computing systems that are associated with various vendors such as merchants (e.g., retail shops, online stores, and the like) and service providers (e.g., utility providers, cleaning services, delivery services, loan services, financial institutions, and the like) with databases of information that include customer information, outstanding debts, bills, and/or invoices, and payment histories. The financial institution computing system accesses information on a vendor server (e.g., vendor servers 122) corresponding to the vendor information received at 710 over a network (e.g., network 120) via the financial institution network logic to determine if any customer debts, bills, and/or invoices are due or coming due to the vendor. The bill pay processing logic at the financial institution computing system then determines any amounts due or coming due to the vendor. In some arrangements, if the customer identified at 712 does not have any amounts due or coming due to the identified vendor, method 700 ends at 714.

In one arrangement, vendor invoice information is transmitted (718). In one such arrangement, vendor invoice information is transmitted by the bill pay processing logic at the financial institution computing system over the network via the network logic to an internet-enabled video screen associated with the customer identified at 712. In another such arrangement, the vendor invoice information is transmitted to a broadcast headend. The vendor invoice information corresponds to the vendor in the bill pay request received at 710 and can include, for example, the vendor's name, an outstanding invoice amount due or an invoice coming due (if any) for the identified customer, and a property code associated with the identified registered biller.

The bill pay is completed (720). The financial institution computing system completes the bill pay by sending the amount of funds to the vendor specified in the bill pay request from the customer's account at the financial institution. The financial institution computing system can complete the bill pay by, for example, causing a hard copy paper check to be drafted and sent to the registered biller, or causing an electronic check to be electronically delivered to the registered biller.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A broadcast headend, comprising:
    an upstream network circuit configured to communicate with a financial institution computing system over an internet network;
    an upstream signal processing circuit configured to broadcast a video content signal over a broadcast medium to a downstream device; and
    a content processing circuit configured to:
        receive a content stream including a unique property code associated with a vendor;
        parse the unique property code associated with the vendor from the content stream in association with the video content signal being broadcast; and
        send a bill pay request to the financial institution computing system to effect a payment to the vendor.

2. The broadcast headend of claim 1, wherein the content processing circuit further includes a database configured to store customer information and is further configured to:
    retrieve information relating to outstanding or upcoming customer payments due to the vendor from a vendor server; and
    send information relating to the outstanding or upcoming customer payments due to the vendor.

3. The broadcast headend of claim 2, wherein retrieving information relating to outstanding or upcoming customer payments due to the vendor further comprises:
    transmitting the unique property code and the customer information to the financial institution computing system to be used to access the vendor server; and
    receiving the information relating to the outstanding or upcoming customer payments from the financial institution computing system.

4. The broadcast headend of claim 2, wherein retrieving information relating to outstanding or upcoming customer payments due to the vendor further comprises:
    transmitting the unique property code to the financial institution computing system;
    receiving a matching vendor from the financial institution computing system; and
    retrieving the information relating to the outstanding or upcoming customer payments due to the vendor from the vendor server corresponding to the matching vendor.

5. The broadcast headend of claim 1, wherein the content processing circuit is further configured to:
    create a new registered biller corresponding to the vendor; and
    send the new registered biller to the financial institution computing system.

6. The broadcast headend of claim 1, wherein the bill pay request further includes instructions to set up recurring payments to the vendor.

7. The broadcast headend of claim 1, wherein the downstream device is an internet-enabled video screen.

8. A computer-implemented method comprising:
    receiving, by a broadcast headend, a content stream including a unique property code associated with a vendor;
    broadcasting, by the broadcast headend, a video content signal associated with the content stream over a broadcast medium to a downstream device;
    parsing, by the broadcast headend, the unique property code associated with the vendor from the content stream in association with the video content signal being broadcast; and
    sending, by the broadcast headend, a bill pay request to a financial institution computing system to effect a payment to the vendor.

9. The computer-implemented method of claim 8, further comprising:
    storing, by the broadcast headend, customer information in a database of the broadcast headend;
    retrieving, by the broadcast headend, information relating to outstanding or upcoming customer payments due to the vendor from a vendor server; and sending, by the broadcast headend, the information relating to the outstanding or upcoming customer payments due to the vendor.

10. The computer-implemented method of claim 9, wherein retrieving information relating to outstanding or upcoming customer payments due to the vendor further comprises:
transmitting, by the broadcast headend, the unique property code and the customer information to the financial institution computing system over an internet network to be used to access the vendor server, the internet network being different than the broadcast medium; and
receiving, by the broadcast headend, the information relating to the outstanding or upcoming customer payments from the financial institution computing system.

11. The computer-implemented method of claim 9, wherein retrieving information relating to outstanding or upcoming customer payments due to the vendor further comprises:
transmitting, by the broadcast headend, the unique property code to the financial institution computing system over an internet network, the internet network being different than the broadcast medium;
receiving, by the broadcast headend, a matching vendor from the financial institution computing system; and
retrieving, by the broadcast headend, the information relating to the outstanding or upcoming customer payments due to the vendor from the vendor server corresponding to the matching vendor.

12. The computer-implemented method of claim 8, further comprising:
creating, by the broadcast headend, a new registered biller corresponding to the vendor; and
sending, by the broadcast headend, the new registered biller to the financial institution computing system.

13. The computer-implemented method of claim 8, wherein the bill pay request further includes instructions to set up recurring payments to the vendor.

14. The computer-implemented method of claim 8, wherein the downstream device is an internet-enabled video screen.

15. A non-transitory computer readable media having computer-executable instructions embodied therein that, when executed by a content processing circuit of a broadcast headend, causes the broadcast headend to perform operations, the operations comprising:
receiving a content stream including a unique property code associated with a vendor;
broadcasting a video content signal associated with the content stream over a broadcast medium to a downstream device;
parsing the unique property code associated with the vendor from the content stream in association with the video content signal being broadcast; and
sending a bill pay request to a financial institution computing system to effect a payment to the vendor.

16. The non-transitory computer readable media of claim 15, the operations further comprising:
storing customer information in a database of the broadcast headend;
retrieving information relating to outstanding or upcoming customer payments due to the vendor from a vendor server; and
sending information relating to the outstanding or upcoming customer payments due to the vendor.

17. The non-transitory computer readable media of claim 16, wherein retrieving information relating to outstanding or upcoming customer payments due to the vendor further comprises:
transmitting the unique property code and customer information to the financial institution computing system over an internet network to be used to access the vendor server, the internet network being different than the broadcast medium; and
receiving the information relating to the outstanding or upcoming customer payments from the financial institution computing system.

18. The non-transitory computer readable media of claim 16, wherein retrieving information relating to outstanding or upcoming customer payments due to the vendor further comprises:
transmitting the unique property code to the financial institution computing system over an internet network, the internet network being different than the broadcast medium;
receiving a matching vendor from the financial institution computing system; and
retrieving the information relating to the outstanding or upcoming customer payments due to the vendor from the vendor server corresponding to the matching vendor.

19. The non-transitory computer readable media of claim 15, the operations further comprising:
creating a new registered biller corresponding to the vendor; and
sending the new registered biller to the financial institution computing system.

20. The non-transitory computer readable media of claim 15, wherein the downstream device is an internet-enabled video screen.

\* \* \* \* \*